United States Patent [19]

Bybee

[11] 3,823,501
[45] July 16, 1974

[54] HOOK SETTER APPARATUS
[76] Inventor: Samuel M. Bybee, Hewins, Kans.
[22] Filed: June 8, 1972
[21] Appl. No.: 261,002

[52] U.S. Cl. ................................................. 43/15
[51] Int. Cl. ........................................... A01k 97/00
[58] Field of Search ......................................... 43/15

[56] References Cited
UNITED STATES PATENTS
| | | | |
|---|---|---|---|
| 2,712,194 | 5/1955 | Di Stefano | 43/15 |
| 3,060,615 | 10/1962 | Spets | 43/15 |
| 3,078,609 | 2/1963 | Efird | 43/15 |

*Primary Examiner*—Hugh R. Chamblee
*Assistant Examiner*—Robert F. Cutting
*Attorney, Agent, or Firm*—Phillip A. Rein

[57] ABSTRACT

This invention is a hook setter apparatus for fishing purposes operable to be secured to a support structure to elevate the same over a water surface and having means to activate a connected fish hook assembly on movement thereof to automatically hook a fish member. More particularly, this invention is a hook setter apparatus having a housing means, and a connector means operable to 1. support the apparatus on a tree limb or the like and 2. support a fish hook assembly attached to the lower end of the housing means and operable upon movement of the fish hook assembly to actuate the actuator means to provide a spring tension to hook and then to hold a fish member.

3 Claims, 6 Drawing Figures

PATENTED JUL 16 1974
3,823,501
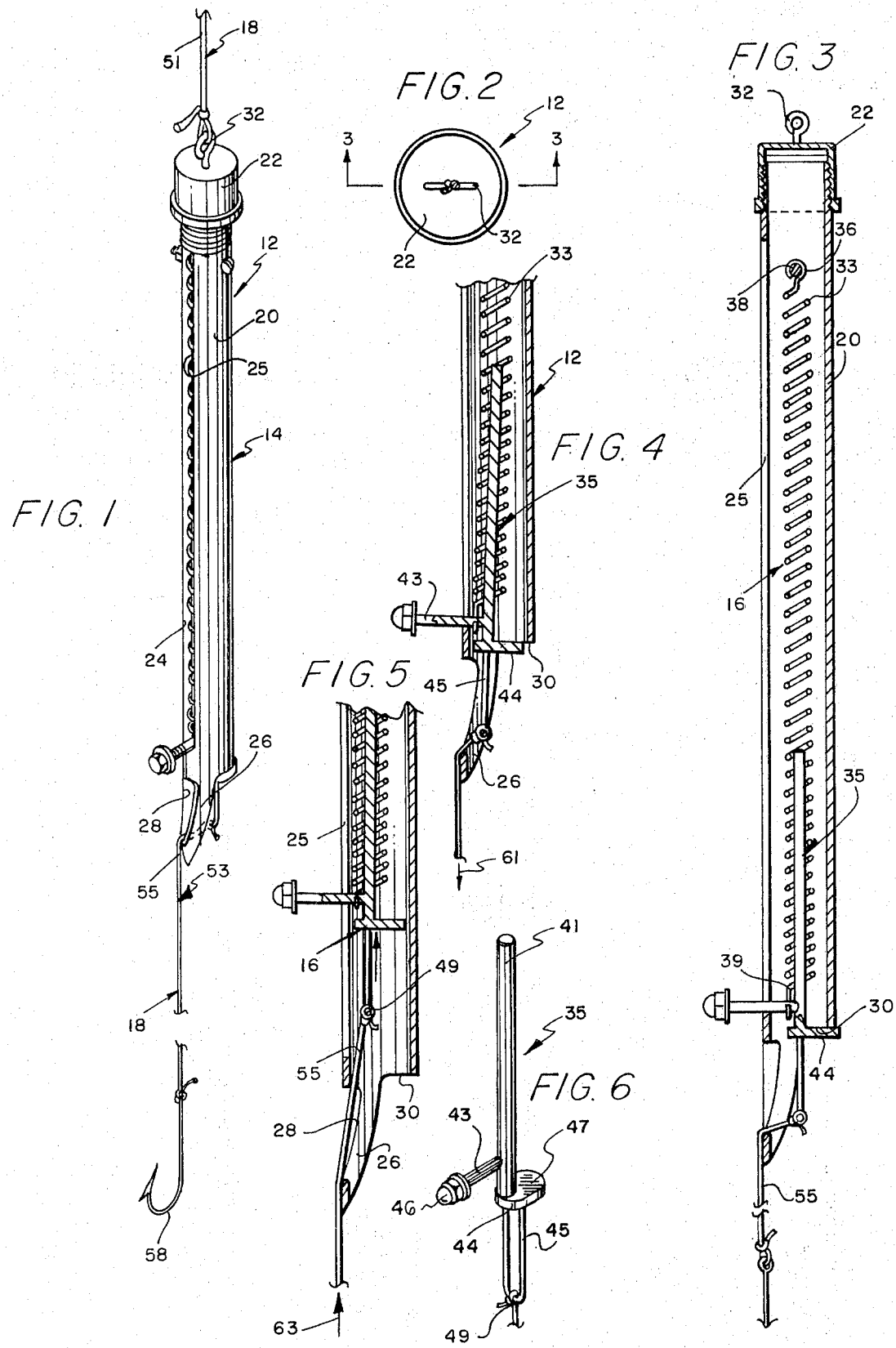

HOOK SETTER APPARATUS

Numerous types of automatic and semi-automatic fish hook setter type structures are known in the prior art but these devices have certain limitations in their usage, are not completely reliable, and depend on the direction and amount of force that a fish member places thereon through a fish hook assembly. Also, some of the prior art structures are difficult to place in usage or load condition and a few are dangerous in usage.

In one preferred embodiment of this invention, a hook setting apparatus is provided having a housing means; an actuator means mounted within the housing means; and a connector means operable to first connect the housing means to a support element and a fish hook assembly connected to a lower end of the housing means. The housing means is provided with a main housing member having a cap member connected to the upper member thereof. The housing member is provided with a cylindrical main body having male external threads at the upper end thereof to receive the cap member and provided at the lower end with a guide section. The cap member has an eyelet member connected to the top surface to receive a support line of the connector means for support. The main body is an elongated cylindrical shape having an elongated axially extended guide slot on one side operable to receive a portion of the actuator means therein. The lower guide section is provided with a tapered end portion having a triangular opening to receive the connector means therethrough and having, opposite therefrom, a cut-out protion, of the main body to present a cam lock surface to receive the actuator means thereagain. The actuator means includes a main spring member secured to the housing means and connected at the opposite lower end to the actuator assembly. The actuator assembly includes an elongated rod member having a lever member extended laterally from a lower portion thereof; is a cam section secured to the lower end of the rod member; and a connector shaft secured to the cam section. The rod member is adapted to be received within the tension spring member to assure proper alignment. The lever member has a shaft section with a cap on the outer end and extends laterally so as to be movable within the elongated guide slot in the housing member. The lower end of the spring member with a hook portion is secured to the shaft section of the lever member. The cam section extends outwardly opposite the lever member and is provided with an arcuate shaped upper surface to engage the cam lock surface of the housing member when in the latched or loaded condition. The lower most end of the connector shaft is connected to the fish hook assembly. The fish hook assembly is provided with a main line having as desired, weight members, hook members, and bait elements connected thereto.

One object of this invention is to provide a hook setter apparatus having a housing means with actuator means mounted therein whereby the actuator means is operable on slight downward movement relative the housing means to become disengaged from a portion of the housing means to provide spring tension to bias the released mechanism for setting a hook in a fish member and holding the same under spring pressure.

One other object of this invention is to provide a hook setter apparatus having a connector means with a fish hook assembly connected to an actuator means mounted within a housing means whereupon any movement of the hook assembly operates to trigger the actuator means for setting a hook in a fish member.

One further object of this invention is to provide a hook setter apparatus which is simple and safe in operation; substantially maintenance free; economical to manufacture; and operable to set a hook member regardless of the direction of movement of the hook member.

Various other objects, advantages, and features of the invention will beome apparent to those skilled in the art from the following discussion taken in conjunction with the accompanying drawings, in which:

FIG. 1 is a perspective view of a hook setter apparatus of this invention;

FIG. 2 is an enlarged top plan view of the hook setter apparatus of this invention;

FIG. 3 is a reduced sectional view taken along line 3—3 in FIG. 2;

FIG. 4 is a fragmentary sectional view similar to FIG. 3 showing an actuator means of the hook setter apparatus of this invention in the initially released condition;

FIG. 5 is a fragmentary sectional view similar to FIG. 4 showing the actuator means being moved upwardly on operation thereof to set a hook member; and FIG. 6 is a perspective view illustrating the actuator means of the hook setter apparatus of this invention.

The following is a discussion and description of preferred specific embodiments of the new hook setter apparatus of this invention, such being made with reference to the drawings whereupon the same reference numerals are used to indicate the same or similar parts and/or structures. It is to be understood that such discussion and description is not to unduly limit the scope of the invention.

Referring to the drawings in detail and in particular to FIG. 1, a hook setter apparatus, indicated generally at 12, is shown in the upright loaded usage condition. The hook setter apparatus 12 includes a main housing means 14; an actuator means 16 mounted within the housing means 14; and a connector means 18 secured to the housing means 14.

The housing means 14 includes a cylindrical housing member 20 having a cap member 22 secured to the upper end thereof. The housing member 20 includes a main cylindrical body 24 having an elongated guide slot 25 along one side thereof and a lower end formed with a guide section 26. The upper end of the main body 24 is provided with external, male threads to receive the cap member 22 thereon. The guide slot 25 is of a width to allow movement of the actuator means 16 therein as will be explained.

The lower guide section 26 is provided with a triangular shaped opening 28 and having opposite therefrom, a cut-out portion of the main body 24 to form a cam lock surface 30 to receive a portion of the actuator means 16 thereagainst as will become obvious.

The cap member 22 is a conventional structure having internal female threads to be mounted about the upper, corresponding male threads of the housing member 20. A central hole in an upper wall of the cap member 22 has an eyelet member 32 therein to be connected to a portion of the connector 18 means as will become obvious.

The actuator means 16 includes a main spring member 33 connected to the housing means 14 at the upper end and to an actuator assembly 35 at the lower end thereof. The spring member 33 is shown as a tension spring type having a circular portion 36 at the upper end mounted about a connector rod 38 which, in turn, is supported through openings in the housing member 20. The lower end of the spring member 33 is formed with a hook portion 39 connected to the actuator assembly 35.

As shown in FIG. 6, the actuator assembly 35 includes an elongated rod member 41; a lever member 43 secured to a lower portion of the rod member 41; a cam section 44 secured to the lower end of the rod member 41; and a U-shaped support member or connector shaft 45 connected to a lower surface of the cam section 45. The rod member 41 is such to be extended to a distance within the spring member 33 to guide movement thereof. The lever member 43 is extended outwardly through the elongated guide slot 25 in the housing member 20 for loading as will be explained. The outer end of the lever member 43 has a cap member 46 thereon for ease of grasping and movement.

The cam section 44 extends in the opposite direction from the lever member 43 and has an irregular shaped upper surface 47 to be engaged with the cam lock surface 30 as will be explained. The connector shaft 45 is formed at the lower end with a curved portion 49 to receive a part of the connector means 18. The connector means 18 includes a support line 51 connected to the eyelet member 32 on top of the cap member 22; and a hook assembly 53 connected to the curved portion 49 of the actuator means 16. More particularly, the hook assembly 53 includes a fish support line 55 secured to the curved portion 49; a weight structure (not shown) if desired connected to the fish support line 55; and a hook member 58 secured to the lower end of the fish support line 55. The fish support line 55 is trained through the triangular opening 28 for reasons to be explained.

In the use and operation of the hook setter apparatus 12 of this invention, it is noted that the same may be connected through the support line 51 to a fishing pole, a tree limb, boat dock, or other such support structures. The lower portion of the actuator means 16 is connected to the hook assembly 53 through the use of the fish support line 55. The hook member 58 may be used with bait thereon or a fishing fly, lure, etc. On placing the hook setter apparatus 12 of this invention in condition for usage, one would grasp the lever member 43 while holding the housing means 14 stationary and move downwardly against tension of the spring member 33 to the lowermost condition as shown in FIG. 4. In this condition, one could move the actuator assembly 35 towards the wall of the housing member 20 opposite the guide slot 25 to place the cam section 44 under and then against the cam lock surface 30 to the condition as shown in FIG. 3 This would place the hook setter apparatus 12 in the loaded condition.

Next, with the hook member 58 baited and placed in the water on hitting of hook member by a fish member, the fish support line 55 would move downwardly as indicated by an arrow 61 in FIG. 4. This movement would cause separation of the cam section 44 from the cam lock surface 30. Next, it is obvious that the force of the spring member 33 would move the entire actuator assembly 35 upwardly as indicated by an arrow 63 in FIG. 5. This upward movement would set hook member 58 within the fish's mouth to hold the fish member under spring tension.

It is to be noted that by the use of lower guide section 26 with the fish support line 55 trained through triangular opening 28 as shown in FIG. 1, regardless of direction of movement of the hook member 58, this would release the cam section 44 from the cam lock surface 30 to actuate the apparatus 12.

It is seen that the hook setter apparatus of this invention provides a structure which is compact in nature; economical to manufacture; maintenance free; guaranteed to actuate regardless of the direction, of force acting thereupon; and being easily movable from the released to the loaded condition.

While the invention has been described in conjunction with preferred specific embodiments thereof, it will be understood that this description is tended to illustrate and not to limit the scope of the invention, which is defined by the following claims.

I claim:

1. A hook setter apparatus operable to be connected to a support structure for automatically setting and holding a fish hook member, comprising:
   a. a housing means having an elongated axially extended guide slot and provided at a lowermost end with a guide section;
   b. an actuator means mounted in said housing means including a biasing means connected to said housing means and an actuator assembly connected to said biasing means;
   c. said actuator assembly having a cam section engagable with a substantial area of said housing means with said biasing means urging said cam section upwardly;
   d. a connector means having a fish support line secured to said actuator assembly and trained through an opening in said guide section whereby movement of said fish support line in any direction operates to release said actuator assembly from the loaded condition on separation of said cam section from said housing means and inward lateral movement of said cam section;
   e. said biasing means is a tension spring member secured at the upper end to said housing means and secured at the lower end to said actuator assembly;
   f. said actuator assembly having a lever portion extended outwardly through said guide slot and having said spring member connected thereto; and
   g. said cam section being an irregular shape having an upper surface to be received against and engage a substantial portion of a cam lock surface of said housing means and forced thereagainst by said biasing means and released after lateral movement of said cam section out of contact with said lower wall whereby said biasing means immediately moves said fish support line upwardly.

2. A hook setter apparatus as described in claim 1 wherein:
   a. said lever portion having a cap member on an outer end for ease of grasping and moving said actuator assembly downwardly against the force of said biasing means to the loaded condition, and
   b. said cam section and said cam lock surface of said housing means are in horizontal contact in the loaded condition to securely hold requiring first lateral and downward movement of said cam section to a position free of contact with said housing means before retraction by said biasing means.

3. A hook setter apparatus operable to be connected to a support structure for automatically setting and holding a fish hook member, comprising:
   a. a housing means having an elongated axially extended guide slot and provided at a lowermost end with a guide section;
   b. an actuator means mounted in said housing means including a biasing means connected to said housing means and an actuator assembly connected to said biasing means;
   c. said actuator assembly having a cam section engagable with a substantial area of said housing means with said biasing means urging said cam section upwardly;
   d. a connector means having a fish support line secured to said actuator assembly and trained through an opening in said guide section whereby movement of said fish support line in any direction operates to release said actuator assembly from the loaded condition on separation of said cam section from said housing means and inward lateral movement of said cam section;
   e. said biasing means is a tension spring member secured at the upper end to said housing means and secured at the lower end to said actuator assembly;
   f. said actuator assembly having a lever portion extended outwardly through said guide slot and having said spring member connected thereto;
   g. said actuator assembly having a connector rod extended within said spring member and secured at a lower end to said cam section, and a connector shaft secured to said cam section and extended downwardly therefrom to receive said fish support line connected thereto; and
   h. a lower end of said connector shaft positioned adjacent and inwardly of said guide section in the loaded condition so that movement of a lower end of said fish support line in any direction causes lateral movement of said cam section.

* * * * *